(12) United States Patent
Ballantine et al.

(10) Patent No.: US 12,275,381 B2
(45) Date of Patent: Apr. 15, 2025

(54) SOLAR HIGHWAY WITH INTEGRATED ENERGY PIPELINE AND VEHICLE RECHARGING OR REFUELING STATIONS

(71) Applicant: Ohmium International, Inc., Newark, CA (US)

(72) Inventors: Arne Ballantine, Incline Village, NV (US); Parke Ballantine, Incline Village, NV (US)

(73) Assignee: Ohmium International, Inc., Newark, CA (US)

( * ) Notice: Subject to any disclaimer, the term of this patent is extended or adjusted under 35 U.S.C. 154(b) by 217 days.

(21) Appl. No.: 18/077,100

(22) Filed: Dec. 7, 2022

(65) Prior Publication Data

US 2023/0174026 A1    Jun. 8, 2023

Related U.S. Application Data

(60) Provisional application No. 63/286,826, filed on Dec. 7, 2021.

(51) Int. Cl.
*B60S 5/02*  (2006.01)
*C25B 1/04*  (2021.01)
*C25B 15/08*  (2006.01)
*H02J 15/00*  (2006.01)
*H02S 10/20*  (2014.01)

(52) U.S. Cl.
CPC .................. *B60S 5/02* (2013.01); *C25B 1/04* (2013.01); *C25B 15/08* (2013.01); *H02J 15/008* (2020.01); *H02S 10/20* (2014.12)

(58) Field of Classification Search
CPC .......... B60S 5/02; H02S 10/20; H02J 15/008; C25B 1/04; C25B 15/08
See application file for complete search history.

(56) References Cited

U.S. PATENT DOCUMENTS

| | | | |
|---|---|---|---|
| 11,236,864 B1 * | 2/2022 | Ewan | F17D 1/02 |
| 2017/0327091 A1 * | 11/2017 | Capizzo | H01M 10/30 |
| 2023/0256848 A1 * | 8/2023 | Jorgenson | C25B 1/04 |
| | | | 320/101 |
| 2023/0272883 A1 * | 8/2023 | Brutoco | F17D 3/18 |
| | | | 48/190 |
| 2023/0407182 A1 * | 12/2023 | Lentz | H01M 8/0656 |

* cited by examiner

*Primary Examiner* — P. Macade Nichols
(74) *Attorney, Agent, or Firm* — Polsinelli LLP

(57) ABSTRACT

A system for an integrated energy pipeline with vehicle recharging or refueling stations is described. The system generates hydrogen gas from solar powered electrolyzers. The system distributes the hydrogen gas for the fueling of vehicles. The system generates the hydrogen gas locally from solar radiation and water provided to the system.

18 Claims, 3 Drawing Sheets

SOLAR HIGHWAY WITH INTEGRATED ENERGY PIPELINE AND VEHICLE RECHARGING OR REFUELING STATIONS

This application claims priority to U.S. Provisional Patent Application No. 63/286,826 entitled "SOLAR HIGHWAY WITH INTEGRATED ENERGY PIPELINE AND VEHICLE RECHARGING OR REFUELING", filed Dec. 7, 2021, the entire contents of which are incorporated by reference herein.

FIELD OF INVENTION

The present invention relates to a solar highway with an integrated energy pipeline with vehicle recharging or refueling stations.

BACKGROUND

Renewable energy installations require large areas for energy production. The renewable energy installations further require access for service. In the past, renewable energy installations are installed in remote locations where large areas of land are available. However, this increases the need to transport the energy generated to a power grid and to an end-user.

SUMMARY

A system for an integrated energy pipeline with vehicle recharging or refueling stations is described. The system provides a renewable energy roadway modular structure which creates generated energy in tandem with converting the generated energy for energy storage and/or for use by vehicles. Solar energy is captured by photovoltaic cells located along a roadway. The solar energy and water are directed to electrolyzer modules for the generation of hydrogen gas. The hydrogen gas is provided to refueling stations also located along the roadway.

In one aspect, a system for an integrated energy pipeline with a vehicle refueling station is described. The system includes a power source to generate or supply electricity. The power source may include photovoltaic cells to generate the electricity. A power electronic system is positioned proximate or near a roadway. The power source provides electricity to the power electronic system. An electrolyzer module generates hydrogen gas through electrolysis. The electrolyzer module is electrically connectable to the power electronic system. The power electronic system supplies the electrolyzer module with the electricity for the electrolysis. A water pipeline is fluidly connectable to the electrolyzer module to provide the electrolyzer module with water for the electrolysis. A hydrogen pipeline is fluidly connectable to the electrolyzer module to transfer hydrogen gas from the electrolyzer module to a refueling station positioned proximate or near the roadway. The refueling station is configured to dispense the hydrogen gas to a vehicle.

DETAILED DESCRIPTION

Figure 1:
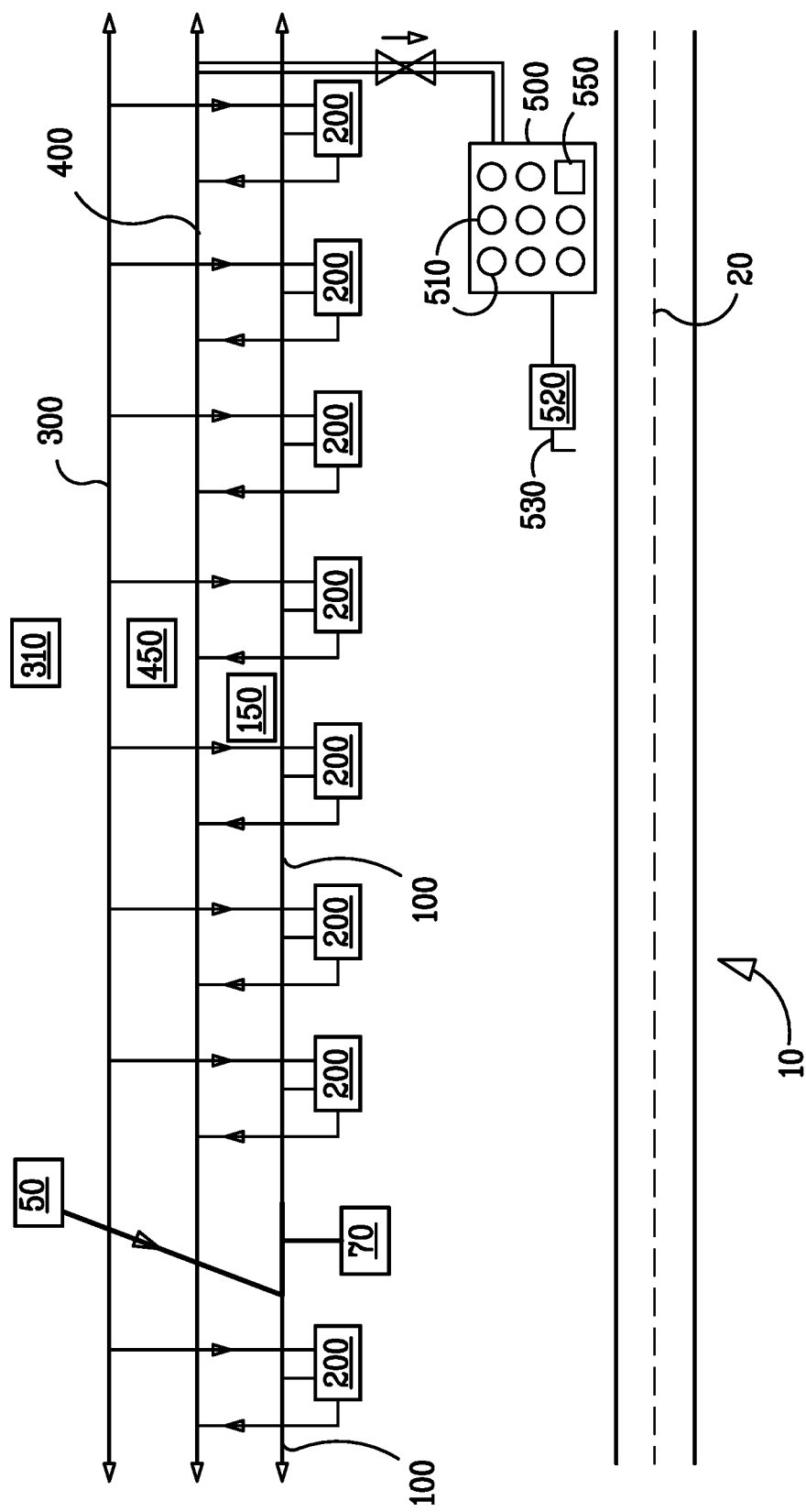
FIG. 1 is a schematic overhead view of the integrated energy pipeline system for vehicle refueling.
Figure 2:
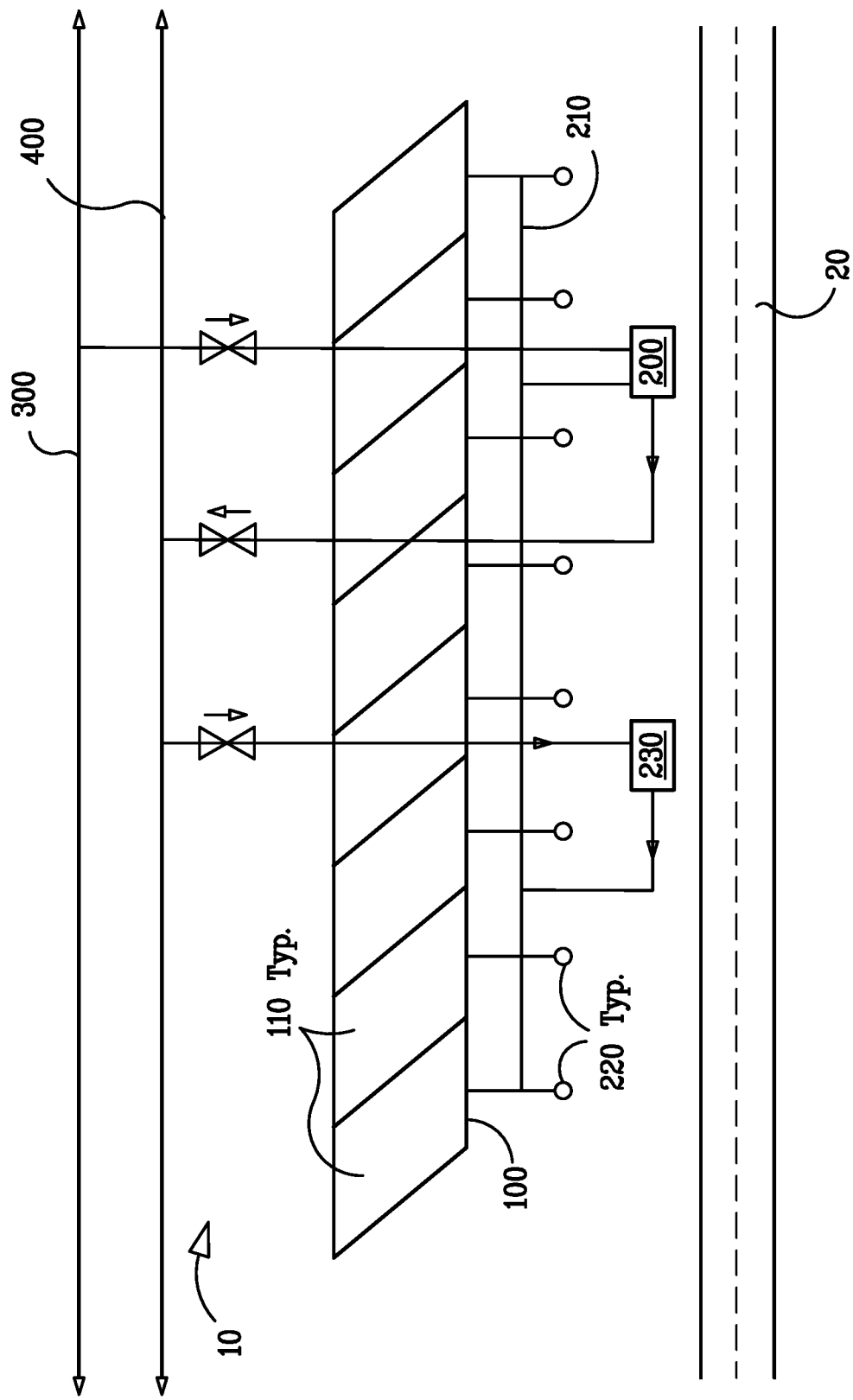
FIG. 2 is a detailed overhead view of the integrated energy pipeline system for vehicle refueling.

A system 10 for an integrated energy pipeline with vehicle recharging or refueling stations is described with respect to FIGS. 1 and 2. The system 10 generates hydrogen gas locally or in a vicinity of the refueling stations. The system 10 distributes the hydrogen gas for the fueling of vehicles. The system 10 generates the hydrogen gas from electrolyzers, which may be powered by photovoltaic cells. Water is provided, collected or supplied to the electrolyzers. The system 10 generates the hydrogen gas proximate or near the refueling station, i.e., the hydrogen gas is not generated off-site or remotely and transported in tanker trucks or other tanks to the refueling station.

The system 10 may be installed proximate a roadway 20, which may include highways, roads, streets, and other transportation lines or transportation infrastructure. In certain aspects, the system 10 may be installed or provided along or above the roadway 20. For example, the system 10 may be installed adjacent to a shoulder of a roadway, in the median of a divided roadway, etc. In other aspects, the system 10 may installed within approximately ¼ mile to approximately 50 miles from the roadway 20. In the aspect of FIGS. 1 and 2, the system 10 is installed adjacent or along the roadway 20.

The system 10 generally includes a power source 50 to generate or provide electricity to the system 10, a power electronic system 100 to condition, transfer and distribute the electricity about the system 10, electrolyzer modules 200 to generate hydrogen gas through electrolysis, a water pipeline 300 to provide the electrolyzer modules 200 with water for electrolysis, a hydrogen pipeline 400 to transfer hydrogen gas from the electrolyzer modules 200 to refueling stations 500, and the refueling stations 500 to dispense the hydrogen gas to vehicles.

The power source 50 may include photovoltaic cells 110, such as shown in FIG. 2. The power source 50 may include panels and/or arrays of the photovoltaic cells 110, which generate electricity from sunlight. In other aspects, the power source 50 may include a municipal electric grid, regional electric grid, private electric grid. The grids may include renewable energy sources (solar, wind, geothermal, hydroelectric, hydrogen fuel cells) and/or non-renewable energy sources (coal, natural gas). The system 10 may include combination of such sources. For example, the photovoltaic cells 110 may be backed up and/or supplemented by other energy sources or supplies, as needed. Further, the power source 50 and/or the power electronic system 100 may include electrical storage 70, such as batteries, to store energy for use in the system 10.

The system 10 generates the hydrogen gas from electrolyzer modules 200 positioned along the roadway 20. The electrolyzer modules 200 are in fluidic communication with the refueling stations 500 via the hydrogen pipeline 400. The electrolyzer modules 200 are generally supplied with electricity generally from the photovoltaic cells 110 along the roadway 20.

The power electronic system 100 conditions, transfers and distributes the electrical load. The power electronic system 100 is electrically connectable to the power source 50 and the electrolyzer modules 200. The power electronic system 100 includes transformers, buses, inverters, rectifiers, etc. The power electronic system 100 supplies the electrolyzer modules 200 with the electricity for electrolysis. A DC busbar 210 may transfer electricity from the photovoltaic cells 110 to the electrolyzer modules 200. As described below, lighting 220 may be electrically connectable to the DC busbar 210 to power the lighting 220. Thus, the power electronic system 100 may provide electricity to the lighting 220. The lighting 220 illuminates the roadway 20 and/or other features of the system 10. In other aspects, the lighting 220 is electrically connectable to the power source 50.

An electronic system control unit 150 may monitor or control the power source 50 and/or the power electronic system 100. The electronic system control unit 150 may also monitor the generation or supply of the electricity of the power source 50. The electronic system control unit 150 may monitor solar conditions and direct the operation of the electrolyzer modules 200 as required. The electronic system control unit 150 may direct and modulate the transfer of electricity to the electrolyzer modules 200 and the DC busbar 210.

Electrolyzer modules 200 are positioned along the roadway 20. The system 10 may include a plurality of the electrolyzer modules 200. The electrolyzer modules 200 are positioned at distances proportional to a density ratio of solar electrical generation such that there is sufficient electricity generated by the power source 50 to operate the electrolyzer modules 200. For example, each electrolyzer module 200 requires a specific amount of energy to operate, and a number of solar cells in the power source 50 needed to supply the specific amount of energy may vary depending on the type and style of the solar cells and the climate, geography, etc. in the area about the solar cells. The electrolyzer modules 200 use the electricity supplied by or generated from the power source 50 to split the water supplied by the water pipeline 300 via electrolysis to form hydrogen and oxygen.

The electrolyzer modules 200 may typically include an electrochemical stack into which electricity may be directed to form hydrogen and oxygen from water using electrolysis. The electrochemical stack may receive water from the water pipeline 300, and the electrochemical stack may be activatable through electrical power from the power electronic system 100 to electrolyze the water in the electrochemical stack to form hydrogen and oxygen. Suitable electrolyzer modules 200 are described in U.S. Patent Publications 2021/0156038 and 2021/0156039 to Ohmium, Inc., which are herein incorporated by reference.

A water pipeline 300 is also provided along the roadway 20. The water pipeline 300 supplies the electrolyzer modules 200 with the water needed for hydrogen generation. The water pipeline 300 is fluidly connectable to the electrolyzer module 200 to provide the electrolyzer module 200 with water for the electrolysis. The water pipeline 300 may include tanks, regulators, pumps, reservoirs, etc. in fluidic communication with the water pipeline 300 to ensure a sufficient flow of water through the water pipeline 300.

A hydrogen pipeline 400 is provided along the roadway 20. The electrolyzer modules 200 direct the created hydrogen gas into the hydrogen pipeline 400. Thus, the hydrogen pipeline 400 fluidly connects the electrolyzer modules 200 and the refueling stations 500 to transfer hydrogen gas from the electrolyzer modules 200 to the refueling stations 500. The hydrogen pipeline 400 may be fluidly connected to multiple electrolyzer modules 200. The hydrogen pipeline 400 may be uni-directional or bi-directional to supply the refueling stations 500 with hydrogen gas. Thus, the hydrogen pipeline 400 may feed refueling stations 500 that are connected upstream and/or downstream to the hydrogen pipeline 400. The hydrogen pipeline 400 may include piping, conduits, hosing, tubing, etc. suitable for the transfer of hydrogen gas.

A hydrogen pipeline control unit 450 may monitor the flow of hydrogen gas in the hydrogen pipeline 400. The hydrogen pipeline control unit 450 may modulate pumps and regulators to provide a desire flow rate and pressure of hydrogen gas to the refueling stations 500. The hydrogen pipeline control unit 450 may monitor sensors and provide warnings upon gas leakage, low gas levels, high pressures, etc. Sub pipelines may fluidly connect the hydrogen pipeline 400 and individual refueling stations 500.

Refueling stations 500 are placed periodically along the roadway 20. The refueling stations 500 draw hydrogen from the hydrogen pipeline 400 for delivery into vehicles. One or more electrolyzer modules 200 may supply hydrogen to a particular refueling station 500 via the hydrogen pipeline 400. The refueling stations 500 may include storage tanks or vessels 510 for storage of hydrogen produced by the system 10. In other aspects, the refueling stations 500 do not include storage tanks or vessels 510.

With reference to FIG. 1, the refueling stations 500 may include a dispenser 530 for the hydrogen gas and electronic commerce kiosks 520 for the user to enter user identification information, process payment information, display fueling status, display operational status, etc. The electronic commerce kiosks 520 may include displays, input devices, memory, data logs, keypads, communication devices, card readers, etc. The refueling stations 500 include a refueling station control unit 550 that is in electrical communication with a main computer system of the operator of the system 10. The refueling station control unit 550 may monitor levels of hydrogen in the vessels 510, notify the system 10 when additional hydrogen gas is required, permit the dispensing of hydrogen gas via the dispenser 530, etc.

The refueling stations 500 typically receive most, if not all, of the hydrogen gas from electrolyzer modules 200 via the hydrogen pipeline 400. In some aspects, the refueling stations 500 may also supply electricity to electric vehicles. The electricity supplied by the refueling stations 500 may be generated from the power source 50, supplied by the electrical storage 70, or other back-up electrical generation systems.

The water pipeline 300 may be fluidly connectable to multiple electrolyzer modules 200. The water pipeline 300 may be co-currently routed adjacent the hydrogen pipeline 400. The water pipeline 300 may contain water captured from the roadway 20 from rain, hydrogen vehicles, water wells, municipal supplies, or other reservoirs of waters. The water pipeline 300 may include one or more water purifiers, filters, water conditioners, etc. to locally purify the water and deliver the water to electrolyzer modules 200. For example, rainwater or run-off from the roadway 20 may be collected, filtered, purified, and supplied to the water pipeline 300. The water pipeline 300 may include piping, conduits, hosing, tubing, etc. suitable for the transfer of water.

A water control unit 310 may direct the water through the water pipeline 300 and to the electrolyzer modules 200. The water control unit 310 may monitor the physical and chemical characteristics of the water in the water pipeline 300 and control the water purifies, filter, and water conditioners. The water control unit 310 may modulate the pumps and regulators to provide a desire flow rate and pressure to the electrolyzer modules 200. The water control unit 310 may be in communication with a number of pressure and flow sensors. Sub pipelines may fluidly connect with the water pipeline 300 and individual electrolyzer modules 200. In other aspects, one or more electrolyzer modules 200 may each connect to different water sources.

The system 10 may include multiple cross-connected headers or electrical buses for fluid flows and power transfer. When leaks or faults occur, the headers and buses provide for isolation of the leaks or faults and the ability to route fluid flows and power transfer around the leaks and faults during times of service.

With respect to FIG. 2, the system 10 may contain lighting 220, such as highly efficient DC powered LED lighting, for optimum conditions for driving on the roadway 20. The lighting 220 may be overhead, in a surface of the roadway 20, along the roadway 20, incorporated into streetlights, or combinations thereof. A fuel cell 230 for the lighting 220 may be supplied with hydrogen from the hydrogen pipeline 400. The fuel cell 230 may also be electrically connected to the DC busbar 210. The fuel cell 230 generates electricity from the hydrogen and provides the electricity to the lighting 220. Thus, the lighting 220 may be powered by either the fuel cell 230, the power source 50, and/or the power electronic system 100, depending on electricity availability and user preference.

The system 10 may include exhaust mitigation, exhaust scrubbing and air filtration along the roadway 20 for vehicles which are not 100% hydrogen or electricity powered and emit particulates, CO, CO2, or other emissions. In the case of CO2 emissions, these may be directed into a pipeline to direct the emissions to a capture location. The system 10 may include tunnels or other partially enclosed structures to capture exhaust and other emissions.

In certain aspects, the system 10 may be fluidly connected or supplied by other sources of hydrogen gas. For example, the system 10 may be fluidly connected to a system for converting waste to hydrogen gas or a bio hydrogen system. The waste system and/or the bio hydrogen system may be fluidly connected to the hydrogen pipeline 400. The waste system may use plasma radiation and/or other energy input methods to convert waste, such as solid waste, into hydrogen. Other waste to hydrogen systems may be employed with the system 10. The bio hydrogen systems use biological methods to generate hydrogen from organic material. In certain aspects, the waste and bio hydrogen systems may be used in conjunction with the electrolyzer modules 200 to provide an additional source of hydrogen gas to the system 10. In certain aspects, the waste and bio hydrogen systems may be a primary supply of hydrogen gas to the system 10.

The system 10 may include communication features, WIFI or other radio signal transmission features for both onboard vehicle bandwidth as well as for vehicle location tracking and accident mitigation. The system 10 may provide users with information and updates regarding accidents, closures, road conditions, fuel availability, waiting times, fuel prices, available services, etc.

The respective control units (the electronic system control unit 150, the water control unit 310, the hydrogen pipeline control unit 450, and the refueling station control unit 550) may be interconnected and/or directed by a remote operator, connected to the main computer system of the operator of the system 10, etc. The various systems may be controlled and directed via remote operation.

Figure 3:
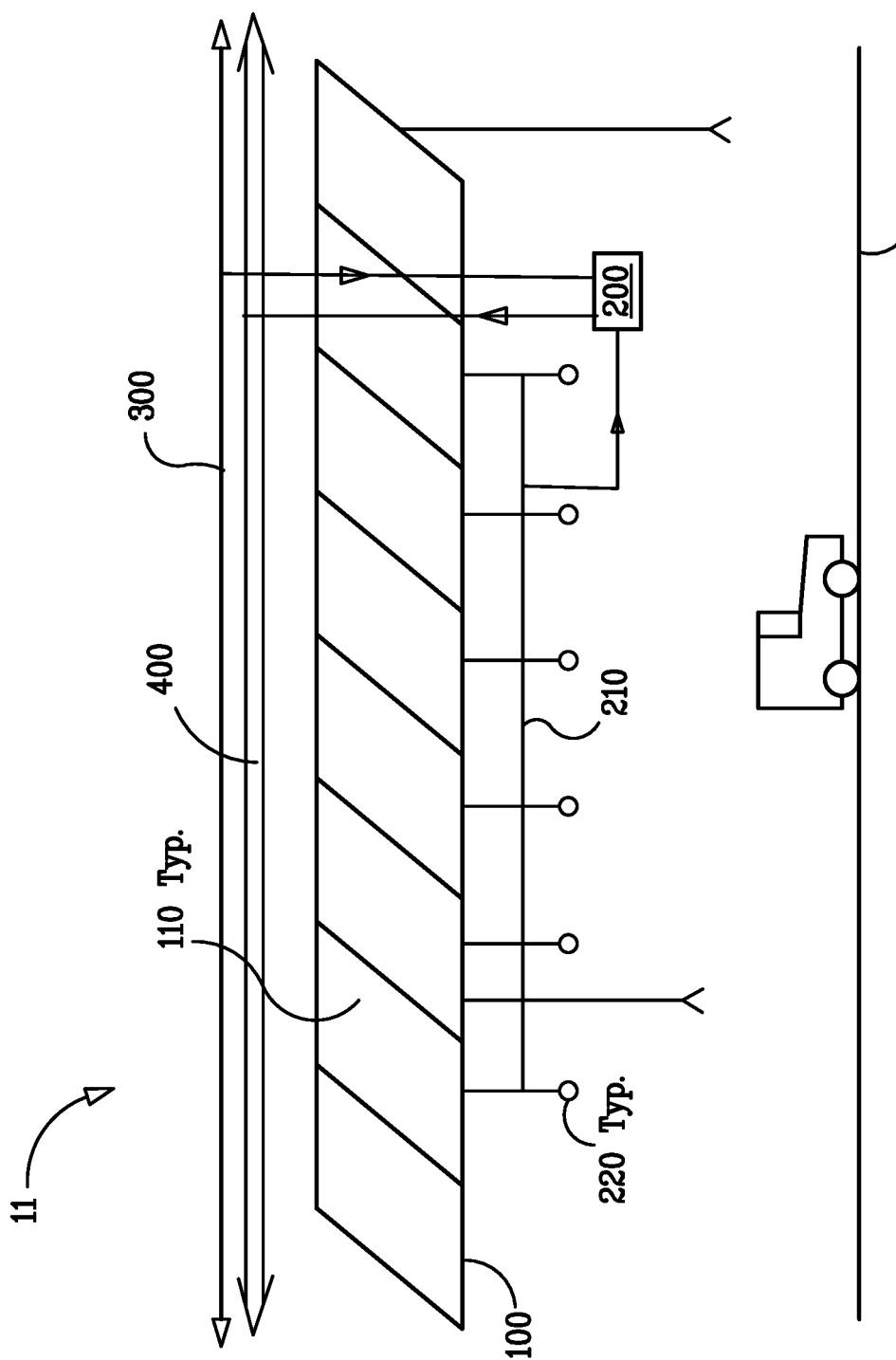
FIG. 3 is a side view of the system over the roadway.

In the aspect of FIG. 3, an over the roadway version of a system 11 is illustrated. The over the roadway system 11 may provide weather protection for vehicles via solar panels and other structures on a roof or other cover which blocks rain or snow accumulation on the roadway 20 underneath. The system 11 generally operates similarly to the system 10. The weather protection provided by the solar panels and the roof may increase longevity of the roadway 20. In this aspect, the hydrogen pipeline 400 may be positioned on or about the roof and above the roadway 20. This positions the hydrogen above the users and vehicular traffic for safety. The water pipeline 300 or other water source may be maintained at ground level. In other aspects, the photovoltaic cells 110 cover or partially cover the roadway 20. For example, the photovoltaic cells 110 alone cover or partially cover the roadway 20. The photovoltaic cells 110 may be installed without the use of a roof structure.

In other aspects, the system 10 may be extended to include rail or magnetic-levitation type transportation installations. Buses, trains, commercial vehicles may similarly utilize the system 10.

In other aspects, the system 10 may include drying or dehumidifying features to remove water from the air to create low humidity about the roadway 20 for maximum visibility. The water would then be directed via a secondary pipeline to be used in the water pipeline 300.

In other aspects, the system 10 may include multiple operational units which each include the power source 50, the power electronic system 100, the electrolyzer modules 200, the water pipeline 300, the hydrogen pipeline 400, and the refueling stations 500. The operational units may share electricity, water, and hydrogen gas or have independent systems for each.

As used herein, a "fluid" connection is a connection that allows for or facilitates the transfer of fluids including liquids and gases. Non-limiting examples of fluid connections include pipes, manifolds, ducts, valves, hoses, couplings, tubes, etc.

As used herein, an "electrical" connection is a connection that allows for or facilitates the transfer of electricity. Non-limiting examples of electrical connections include wires, cables, power lines, breakers, transformers, converters, rectifiers, switches, etc.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for an integrated energy pipeline with a vehicle refueling station, comprising:
   a power source comprising photovoltaic cells to generate electricity;
   a power electronic system electrically connectable to the power source to distribute the electricity;
   an electrolyzer module electrically connectable to the power electronic system to generate hydrogen gas;
   a water pipeline fluidly connectable to the electrolyzer module to provide the electrolyzer module with water;
   a hydrogen pipeline fluidly connectable to the electrolyzer module to transfer hydrogen gas generated by the electrolyzer module to a refueling station positioned proximate a roadway; and
   the refueling station configured to dispense the hydrogen gas to a vehicle.

2. The system according to claim 1, wherein the hydrogen pipeline is fluidly connectable to a plurality of electrolyzer modules.

3. The system according to claim 1, wherein the electrolyzer module is proximate or near the refueling station.

4. The system according to claim 1, wherein a fuel cell is fluidly connectable to the hydrogen pipeline, the fuel cell generates additional electricity from the hydrogen gas and provides the electricity to lighting, and the lighting is configured to illuminate the roadway.

5. The system according to claim 4, wherein the power source is configured to supply electricity to the lighting.

6. The system according to claim 1, wherein the power source supplies the refueling station with electricity, and the refueling station is configured to recharge electric vehicles.

7. The system according to claim 1, wherein the refueling station includes a storage tank or vessel for storage of hydrogen produced by the system, and the refueling station includes a dispenser for the hydrogen gas.

8. The system according to claim 1, wherein the water pipeline is co-currently routed adjacent the hydrogen pipeline.

9. The system according to claim 1, wherein the hydrogen pipeline is positioned above the roadway.

10. The system according to claim 1, wherein the photovoltaic cells are positioned above the roadway.

11. The system according to claim 1, wherein the system is installed near or proximate a roadway.

12. The system according to claim 1, wherein the hydrogen gas is not generated off-site and delivered to the refueling station.

13. A system for an integrated energy pipeline with a vehicle refueling station, comprising:
    an electrolyzer module for being electrically connected to a power source and a power electronic system;
    a water pipeline for being fluidly connected to the electrolyzer module to provide the electrolyzer module with water; and
    a hydrogen pipeline for being fluidly connected to the electrolyzer module to transfer hydrogen gas generated by the electrolyzer module to a refueling station positioned proximate to a roadway.

14. The system according to claim 13, wherein the electrolyzer module is positioned proximate or near the roadway.

15. The system according to claim 14, wherein the electrolyzer module is positioned within approximately ¼ mile to approximately 50 miles from the roadway.

16. The system according to claim 13, wherein the power source includes photovoltaic cells.

17. The system according to claim 13, further comprising a plurality of electrolyzer modules for being electrically connected to the power source and the power electronic system.

18. The system according to claim 17, wherein the plurality of electrolyzer modules for being fluidly connected by the hydrogen pipeline, wherein the refueling station for being fluidly connected by the hydrogen pipeline.

* * * * *